United States Patent
Rousseau et al.

(10) Patent No.: US 6,937,962 B2
(45) Date of Patent: Aug. 30, 2005

(54) PREDICTIVE DIAGNOSTIC SYSTEM IN A PROGRAMMABLE AUTOMATON

(75) Inventors: Robert Rousseau, Antibes (FR); François Bonnard, Raleigh, NC (US); Alain Lafuite, Falicon (FR)

(73) Assignee: Schneider Automation, Valbonne (FR)

( * ) Notice: Subject to any disclaimer, the term of this patent is extended or adjusted under 35 U.S.C. 154(b) by 26 days.

(21) Appl. No.: 10/477,569

(22) PCT Filed: May 7, 2002

(86) PCT No.: PCT/FR02/01577
§ 371 (c)(1),
(2), (4) Date: Nov. 13, 2003

(87) PCT Pub. No.: WO02/093277
PCT Pub. Date: Nov. 21, 2002

(65) Prior Publication Data
US 2004/0153172 A1 Aug. 5, 2004

(30) Foreign Application Priority Data
May 16, 2001 (FR) .......................................... 01 06682

(51) Int. Cl.[7] .......................... G06F 11/30; G21C 17/00
(52) U.S. Cl. ..................................................... 702/183
(58) Field of Search ........................... 702/81, 84, 179, 702/181–186, 188, 189; 714/37, 47, 48

(56) References Cited

U.S. PATENT DOCUMENTS

| | | | |
|---|---|---|---|
| 5,410,495 A | 4/1995 | Ramamurthi | ................ 702/100 |
| 5,926,621 A | 7/1999 | Schwarz et al. | ............... 714/26 |
| 6,115,682 A * | 9/2000 | Omtzigt | ....................... 702/188 |
| 2002/0016550 A1 * | 2/2002 | Sweeney et al. | ............ 600/515 |

FOREIGN PATENT DOCUMENTS

| | | |
|---|---|---|
| EP | 0 292 914 | 11/1988 |
| EP | 0 424 869 | 5/1991 |
| EP | 0 572 767 | 12/1993 |

* cited by examiner

*Primary Examiner*—Michael Nghiem
(74) *Attorney, Agent, or Firm*—Oblon, Spivak, McClelland, Maier & Neustadt, P.C.

(57) ABSTRACT

The invention relates to a diagnostic system which involves the use of a piece of observed information (5) coming from a process (1) monitored by a programmable automaton (10). The diagnostic system includes: an observation module (30) which collects, at input, the information observed (5) and delivers, at output, a piece of processed information (35) to a learning module (40); and a detection module (20) which collects, at input, the observed information (5) in order to apply a detection process (21) thereto including a diagnostic function (45), which comes from the learning module (40), in order to deliver a diagnostic result (25) at output. The observation module (30) and the detection module (20) are executed by the processing unit (11) of the programmable automaton (10) in the form of function units in accordance with standard IEC1131-3. The learning module (40) elaborates the diagnostic function (45) using an algorithm based on neural networks or on fuzzy logic.

11 Claims, 2 Drawing Sheets

PREDICTIVE DIAGNOSTIC SYSTEM IN A PROGRAMMABLE AUTOMATON

FIELD OF THE INVENTION

This invention relates to a diagnostic system made from observation of one or several signals coming from a process to be monitored. This diagnostic system is embedded in a programmable logic controller and may be applicable to any automation assembly comprising at least one programmable logic controller designed to control and/or monitor a process in the field of industrial process automation, building automation or monitoring/control of electrical distribution networks. The invention also relates to a diagnostic process used in such a diagnostic system.

BACKGROUND OF THE INVENTION

Automated processes are usually controlled and monitored by programmable logic controllers, the main role of which is to acquire information from the process (input signals), to run an application program (also called the user program) using this information so as to output orders and commands to the process (output signals). Systems capable of making a diagnostic, and particularly a predictive diagnostic capable of anticipating the occurrence of a failure or a defect, are now frequently required so that this type of automated process can be monitored better. These systems firstly facilitate planning and optimisation of maintenance operations, and secondly minimize risks of stoppages or incidents in the process, thus contributing to safety and efficiency of the automation.

However, a reliable predictive diagnostic is frequently difficult to achieve since it may require a difficult selection among the many parameters of the process to be monitored while using complex algorithms necessary to satisfactorily make a model of the process. This model then uses large scale computer means, with high processing power and large memory capacity, that are difficult to integrate in programmable logic controllers. Furthermore, computer languages that are usually used to implement these algorithms are very different from the languages usually used in automation application programs, like those satisfying standard IEC1131-3.

BRIEF SUMMARY OF THE INVENTION

Therefore, the purpose of the invention is to design a diagnostic system that can easily be built into a programmable logic controller. Furthermore, the system is designed to make a predictive diagnostic on a process that cannot be modelled mathematically. To achieve this, the result of the diagnostic will be related to observation of one or several simple process signals, on which learning will be done and on which an attempt will be made to recognize changes that can be used to predict the occurrence of an event or a fault in the process. Based on the observed signals and selected samples, this type of system will also be capable of evaluating a probability of the presence of a defect, for example between a minimum value corresponding to normal operation of the monitored process and a maximum value corresponding to a proven defect in the monitored process.

The part used for observation and detection is necessarily embedded in the programmable logic controller. The learning part that will use a detection algorithm determined based on observed data, can also be embedded in the programmable logic controller if its capacities are sufficient, or it could also be embedded in a different computer equipment capable of communicating with the programmable logic controller so as to avoid overloading the processing unit or the programmable logic controller memory. In this case, the learning part would interface with the operator through dialogue means connected to the logic controller.

To achieve this, the invention describes a diagnostic system made from information observed from a process monitored by a programmable logic controller. This programmable logic controller is provided with at least one processing unit to run an application program stored in storage means in the programmable logic controller. The diagnostic system is characterised in that it comprises:

- an observation module stored in said storage means and run by the processing unit of the programmable logic controller, collecting the observed information as input, to apply an observation processing to it, in order to output a processed information representative of the observed information,
- a learning module, generating a diagnostic function from several items of processed information received from the observation module during a determined time period,
- a detection module, stored in said storage means and run by the processing unit of the programmable logic controller, collecting the observed information as input, to apply a detection processing to it comprising the diagnostic function derived from the learning module, in order to output a diagnostic result.

The observed information comprises one or several analogue and/or digital signals supplied by the detection means connected to the programmable logic controller.

The diagnostic system according to the invention also comprises a detection module stored in the storage means, run by the processing unit of the programmable logic controller, collecting the observed information as input, to apply a detection processing to it comprising a diagnostic function output from the learning module, in order to output a diagnostic result.

The observation module and the detection module are integrated into the application program in the form of one or several function blocks, according to the meaning defined in standard IEC1131-3. These function blocks may themselves be written in one of the languages defined by standard IEC1131-3, or in another language, for example the C language.

The invention also describes a predictive diagnostic process implemented by such a diagnostic system. The process includes an observation step in which the observation module reads the observed information, applies an observation processing to the observed information and transmits processed information to the learning module, a learning step in which the learning module generates a diagnostic function from the processed information, a loading step in which the learning module transfers the generated diagnostic function into the detection module, an interpretation step in which the detection module reads the observed information, applies a detection processing to the observed information including the diagnostic function, and outputs a diagnostic result.

BRIEF DESCRIPTION OF THE DRAWINGS

Other features and advantages will be seen in the detailed description given below with reference to an embodiment set out as an example and represented in the attached drawings on which.

DETAILED DESCRIPTION OF THE INVENTION

Figure 1:
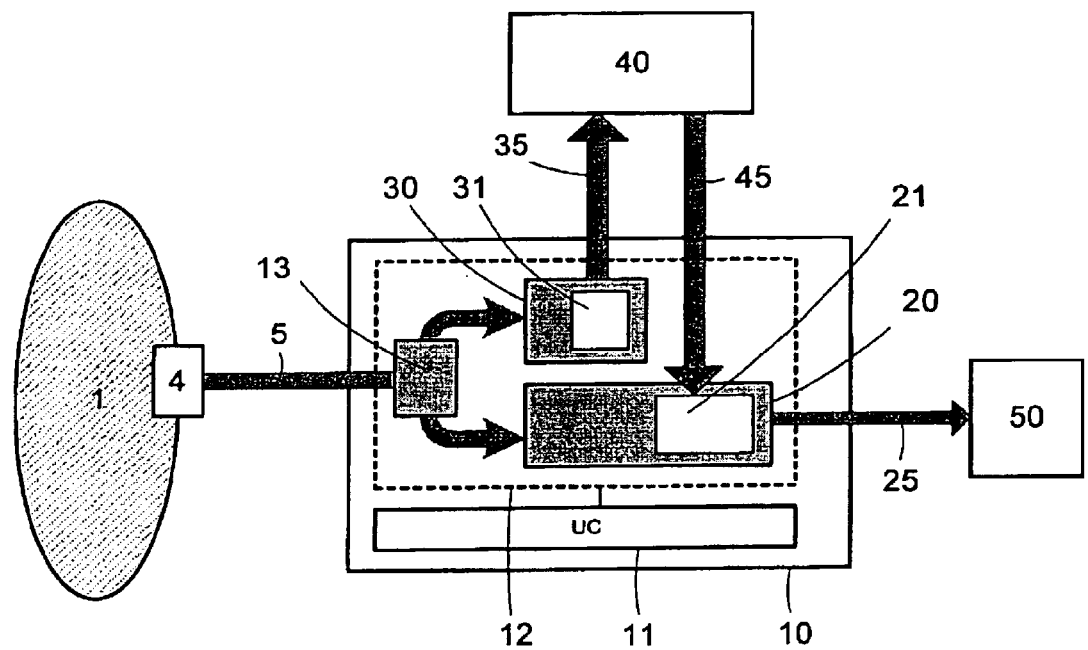
FIG. 1 shows a functional diagram of the diagnostic system in accordance with the invention.

With reference to FIG. 1, a programmable logic controller 10 comprises at least one processing unit 11 adapted to run an application program (or user program) stored in storage means 12 of the programmable logic controller 10, in a known manner. One of the main functions of this application program is to control and monitor a process 1, for example belonging to the field of industrial process automation, building automation or monitoring/control of electrical distribution networks. The programmable logic controller 10 comprises one or several input/output modules not shown in FIG. 1, firstly for acquisition of input information (for example of the On/Off, analogue or counting type) originating from process sensors 4 and secondly for supplying orders and commands to pre-actuators and actuators of the process 1 as output.

The programmable logic controller 10 may also be equipped with modules or other communication means in order to connect it to any third party equipment such as a dialogue terminal or a computer network or equipment.

The storage means 12 are composed of volatile and non-volatile memories, for example RAM memory, FLASH memory or REPROM memory or any other storage means such as PCMCIA cards.

The application program of a programmable logic controller 10 is usually written in one or several automation languages which in particular include Ladder Diagrams, Sequential Function Charts, Function Blocks or text language. These automation languages are advantageously conform with standard IEC1131-3, so as to facilitate programming by an automation designer who does not necessarily have a detailed knowledge of computer languages.

The diagnostic system described in the present invention comprises an observation module 30 run by the processing unit 11 of the programmable logic controller 10. This observation module 30 is stored in the storage means 12. It may be in the form of one or several function blocks according to standard IEC1131-3, so that it can advantageously be integrated in the application program of the programmable logic controller 10. Observed information 5 output from the process 1 to be monitored is input to the observation module 30 through input modules with the programmable logic controller 10. The observed information 5 preferably comprises one or several analogue and/or digital signals output by detection means 4 for monitoring the process 1. These detection means 4 may be composed of one or several sensors connected to the programmable logic controller 10 and that will make measurement or state acquisitions relative to the process 1.

The observed information 5 is usually subjected to preliminary processing 13 so as to perform filtering, calibration, scaling or any other operation on this raw information. The preliminary processing may be done by hardware means that may or may not be integrated in the programmable logic controller 10 or by software means 13 stored in the storage means 12 as shown in the example in FIG. 1. The observed information 5 derived from this preliminary processing 13 is then sent to the observation module 30 and to the detection module 20.

The observation module 30 comprises an observation processing 31 applied to the observed information 5 in order to supply the observation module 30 with processed information 35 representative of the observed information 5 as output. In particular, depending on the application type, the observation processing 31 may include an event dating function to attach a precise time dating to the observed information 5 or a usable data formatting function.

The processed information 35 is sent to a learning module 40 that memorises it. According to a first variant of the invention shown in FIG. 1, the learning module 40 is run in equipment separate from the programmable logic controller 10, for example a PC type computer equipment. This computer equipment must then be capable of communicating with the programmable logic controller 10 through a module or another means of communication with the programmable logic controller 10.

According to a second similar variant not shown in the figures, it is also possible to embed the learning module 40 in the programmable logic controller 10. The learning module 40 is then for example integrated in the central unit of the programmable logic controller, in a dedicated module or in a coprocessor specific to the programmable logic controller 10, provided with a processing unit and specific storage means and an operator dialogue interface, the communication between the dedicated module and the programmable logic controller then being made through the logic controller back panel bus. The choice between either of the two variants is made particularly as a function of the power of the programmable logic controller 10 and its capacity to host a learning module 40.

The learning module 40 stores data supplied by the received processed information 35. An operator can then display the data thus stored using an adapted operator dialogue interface. The operator selects the data sequences that he considers are relevant to the required diagnostic, to build a reference sample.

The searched diagnostic may indifferently be either the detection of abnormal operation at the process to be monitored, or a calculation of the probability of normal operation, or preferably detection of the future occurrence of events or defects, possibly sorted by type, thus supplying a predictive diagnostic of the process. The number of data sequences to be selected depends on the diagnostic searched and the type of algorithm used for detection in the learning module. The processed information 35 may thus be observed continuously or during one or several determined time periods (called observation time windows) that depend on the observed process and that the user will choose as a parameter of the observation module 30.

When the sample is considered satisfactory with regard to the process to be monitored and the algorithm used for detection, the operator asks for the learning module 40 to perform a diagnostic function 45, and this diagnostic function will then be transferred into the storage means 12 of the programmable logic controller 10. The algorithm used in the learning module 40 to generate the diagnostic function 45 is a digital learning type algorithm, in other words an algorithm that uses previously observed digital data. This algorithm may be selected among a library of several algorithms accessible to the learning module 40. For example, the chosen algorithm integrates a technology based on neural networks or a technology based on fuzzy logic. The number of samples necessary, the calculation method, the validation process and the diagnostic function, depend on the technology of the algorithm chosen. The calculation of the diagnostic function 45 may require major computer means that are not necessarily compatible with the means of a programmable logic controller 10. Therefore, one of the advantages of the invention is to enable a simple programmable logic controller to make a predictive diagnostic using a possibly complex algorithm, without necessarily being limited by the constraints generated by the calculation and the development of the diagnostic function in the processing unit 11. Another advantage of the invention is to provide the possibility of using existing learning software available on PC type computer equipment as a function of the technology of the algorithm chosen, to generate the diagnostic function 45.

The diagnostic system also comprises a detection module 20 run by the processing unit 11. This detection module 20 is stored in the storage means 12. It may be in the form of one or several function blocks as defined for standard IEC1131-3, so that it can advantageously be integrated in the application program of the programmable logic controller 10. Similarly, the detection module 20 could also be integrated with the observation module 30 in the same function block. The role of the detection module 20 is to read the observed information 5 derived from the process 1, and to apply detection processing 21 to it so as to supply a diagnostic result 25 as output. The detection processing 21 includes the diagnostic function 45 generated and loaded from the learning module 40 in the storage means 12. The diagnostic function 45 may be stored in several forms, for example as a compiled function to be run on the logic controller, or in the form of terms of a polynomial function included in the detection processing 21.

The diagnostic result 25 is sent to a result interpretation module 50 and may be in the form of a message, a determined value assigned to one or several variable(s) or in any other form that can be used by the result interpretation module 50. This module may perform a predefined action when it receives the result of the diagnostic. A predefined action may include signalling an alarm, generating a command, sending a message, etc. The result interpretation module 50 may indifferently be located inside or outside the programmable logic controller 10.

Figure 2:
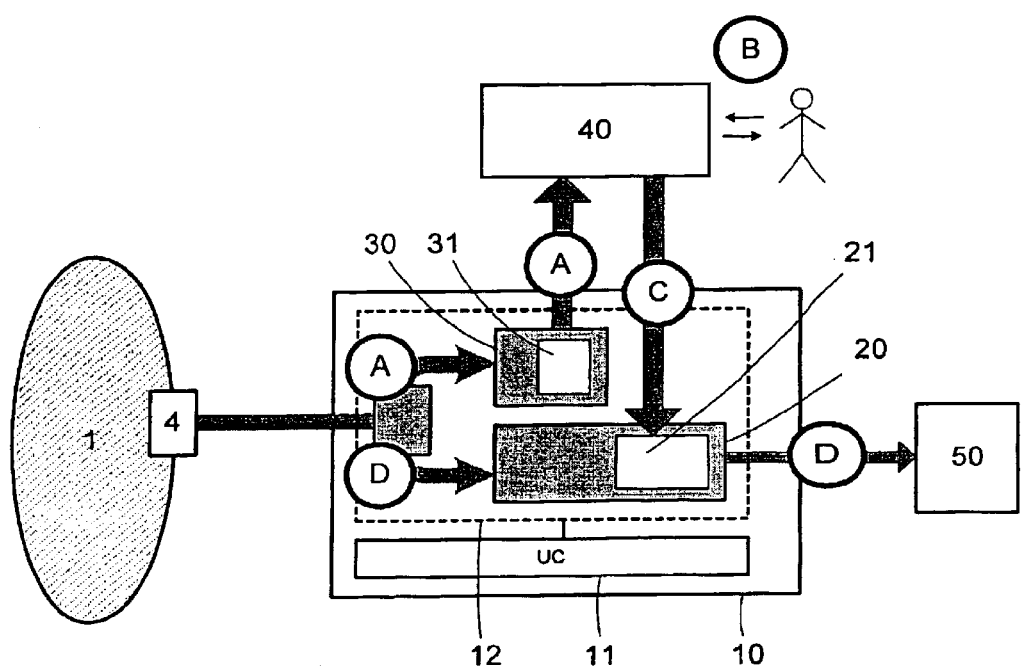
FIG. 2 shows the steps in the diagnostic process used in the invention.

With reference to FIG. 2, the diagnostic system thus described uses a predictive diagnostic process that includes the following steps.

An observation step A in which the observation module 30 reads the observed information 5 necessary to be able to make the required diagnostic on the process 1. In general, information 5 originating from process 1 is physically read by an input/output module that writes the measured value in an input/output RAM in the programmable logic controller 10. In this case, the observation module 30 reads the contents of this input/output memory. The observed information 5 is composed of one or several signals for which it is estimated that variations may enable the required diagnostic. The observation module 30 applies the observation processing 31 to this observed information 5, to transmit processed information 35 to the learning module 40.

A learning step B in which the learning module 40 generates a diagnostic function 45 from several items of processed information 35 stored in the learning module 40, using a selected detection algorithm. During this step, operator assistance is necessary to choose the right processed information that should be used for the required diagnostic.

A loading step C in which the diagnostic function 45 generated by the learning module 40 is transferred in the storage means 12 of the programmable logic controller 10 and is integrated into the detection module 20 so that it can be run by the processing unit 11.

An interpretation step D in which the detection module 20 reads the observed information 5, using the input/output memory. A detection processing 21 including the diagnostic function 45 is applied to this observed information 5 so as to output a diagnostic result 25 to the result interpretation module 50. This interpretation step D corresponds to operational functioning of the diagnostic system.

Figure 3:
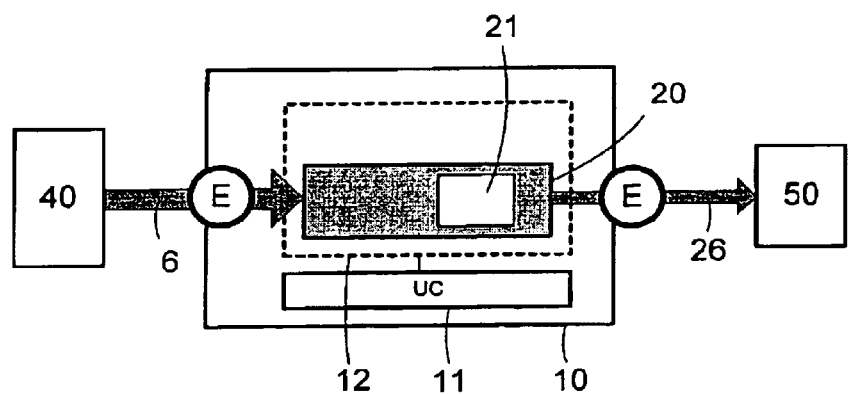
FIG. 3 shows the simulation step of the diagnostic process in greater detail.

The process also comprises a simulation step E indicated in FIG. 3, for testing execution of the detection module 20 of the programmable logic controller 10, particularly during debugging phases. During this step E, the learning module 40 sends a test sample 6 to the detection module 20, this test sample 6 replacing the observed information 5 output from the process 1 and usually being chosen by the operator. The diagnostic processing 21 is applied to this test sample 6 in order to output a result of the diagnostic test 26 that is then analysed. Therefore, it is possible to simulate particular situations that could occur at the process 1, to study the behaviour of the detection module 20 in these precise cases without disturbing operation of the process, thus very much facilitating debugging of the diagnostic system.

In one preferred embodiment, the observation module 30 and the detection module 20 may be run by the processing unit 11 in parallel, these two modules having access to the same observed information 5 read in the input/output memory after the preliminary processing 13, and provided that a first diagnostic function 45 has already been loaded in the detection module 20. Thus, while the diagnostic system is in operational functioning, the learning module 40 can continue to receive processed information 35 so that an operator can continue to refine the diagnostic function or to find new data sequences in relation with a required diagnostic. This provides considerable flexibility of use of the described invention, thus giving the operator considerable latitude to use and especially to improve and refine the diagnostic system even after it is operational, without disturbing operation of the automated process. The observation step A and the learning step B may be continuous or may be surrounded by observation time windows configured by the operator in the learning module 40.

According to one variant, the observation module 30 and the detection module 20 can be integrated into a dedicated module in the programmable logic controller 10, provided with a specific processing unit, specific storage means and access to the programmable logic controller input/output memory. This dedicated module is capable of executing the observation module 30 and the detection module 20, to relieve the load on the processing unit 11 of the programmable logic controller 10.

Obviously, it would be possible to imagine other variants and improvements to detail and even to envisage the use of equivalent means without going outside the framework of the invention.

What is claimed is:

1. Diagnostic system made from observed information from a process monitored by a programmable logic controller provided with at least one processing unit to run an application program stored in storage means in the programmable logic controller, characterised in that the diagnostic system comprises:

an observation module, stored in said storage means and run by the processing unit, collecting the observed information as input, to apply an observation processing to the observed information, in order to output a processed information representative of the observed information, a learning module generating a diagnostic function from several items of processed information received from the observation module during a determined time period, a detection module, stored in said storage means and run by the processing unit, collecting the observed information as input, to apply to the observed information a detection processing comprising the diagnostic function derived from the learning module, in order to output a diagnostic result.

2. Diagnostic system in accordance with claim 1, characterised in that the observed information comprises one or several analogue and/or digital signals supplied by the detection means connected to the programmable logic controller.

3. Diagnostic system in accordance with claim 1, in which the application program of the programmable logic controller is written in one or several languages conform with standard IEC1131-3, characterised in that the observation module and the detection module are integrated in the application program in the form of one or several function blocks as defined for standard IEC1131-3.

4. Diagnostic system in accordance with claim 3, characterised in that the learning module is run by a computer equipment separate from the programmable logic controller, capable of communicating with the programmable logic controller.

5. Diagnostic system in accordance with claim 3, characterised in that the learning module is embedded in the programmable logic controller.

6. Diagnostic system in accordance with claim 3, characterised in that the observation processing includes an event dating function.

7. Diagnostic system in accordance with claim 3, characterised in that the learning module generates the diagnostic function by using an algorithm based on neural networks.

8. Diagnostic system in accordance with claim 3, characterised in that the learning module generates the diagnostic function by using an algorithm based on fuzzy logic.

9. Predictive diagnostic process used by a diagnostic system in accordance with any one of claims 1–8, characterised in that it includes the following steps:

an observation step in which the observation module reads the observed information, applies an observation processing to the observed information and transmits a processed information, representative of the observed information, to the learning module, a learning step in which the learning module generates a diagnostic function from several items of processed information, a loading step in which the learning module transfers the generated diagnostic function into the detection module, an interpretation step in which the detection module reads the observed information, applies a detection processing to the observed information, comprising the diagnostic function, and outputs a diagnostic result.

10. Predictive diagnostic process in accordance with claim 9, characterised in that it also comprises a simulation step in which the detection module receives as input a test sample from the learning module, applies the detection processing to the test sample and outputs a diagnostic test result.

11. Predictive diagnostic process in accordance with claim 9, characterised in that the observation step and the interpretation step may be run in parallel by the processing unit in the programmable logic controller.

* * * * *